US008879655B2

(12) United States Patent
Zhang et al.

(10) Patent No.: US 8,879,655 B2
(45) Date of Patent: Nov. 4, 2014

(54) METHOD AND APPARATUS FOR OBTAINING CHANNEL STATE INFORMATION REQUIRED FOR BEAMFORMING

(75) Inventors: Yu Zhang, Beijing (CN); Ye Wu, Beijing (CN); Ming Lei, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 562 days.

(21) Appl. No.: 13/216,676

(22) Filed: Aug. 24, 2011

(65) Prior Publication Data
US 2012/0082198 A1 Apr. 5, 2012

(30) Foreign Application Priority Data

Sep. 30, 2010 (CN) .......................... 2010 1 0506479

(51) Int. Cl.
*H04B 7/02* (2006.01)
*H04B 7/06* (2006.01)
*H04B 17/00* (2006.01)

(52) U.S. Cl.
CPC ............ *H04B 7/0617* (2013.01); *H04B 7/0626* (2013.01); *H04B 7/0654* (2013.01); *H04B 17/0075* (2013.01)
USPC ........................................ 375/267; 375/340

(58) Field of Classification Search
USPC ................................................. 375/267, 340
See application file for complete search history.

(56) References Cited

U.S. PATENT DOCUMENTS

| 2006/0165008 | A1* | 7/2006 | Li et al. ......................... 370/252 |
| 2011/0019715 | A1* | 1/2011 | Brisebois ....................... 375/130 |
| 2011/0299480 | A1* | 12/2011 | Breit et al. .................... 370/329 |
| 2012/0122407 | A1* | 5/2012 | Allpress et al. ............ 455/67.11 |

FOREIGN PATENT DOCUMENTS

| CN | 1399436 A | 2/2003 |
| JP | 2003-143065 A | 5/2003 |
| JP | 2009-526480 A | 7/2009 |

OTHER PUBLICATIONS

Office Action, dated Dec. 19, 2012, issued by the Japanese Patent Office in counterpart Japanese Patent Application No. 2011-164147.
Office Action, dated Apr. 17, 2014, issued by the State Intellectual Property Office of the People's Republic of China, in counterpart Application No. 201010506479.8.

* cited by examiner

*Primary Examiner* — Don N Vo
(74) *Attorney, Agent, or Firm* — Sughrue Mion, PLLC

(57) ABSTRACT

The present invention provides a method for obtaining channel state information required for beamforming, comprising: estimating current channel state information according to a received signal; predicting future channel state information which is expected to be used by a transmitter in the next beamforming based on the current channel state information and historical channel state information; reading previous channel state information used by the transmitter in the current beamforming; determining feedback information based on the future channel state information and the previous channel state information; and sending the feedback information to the transmitter. The present invention further provides a method for performing beamforming, comprising: receiving feedback information from a receiver; reading previous channel state information used in the last beamforming; reconstructing channel state information based on the feedback information and the previous channel state information; and performing beamforming according to the reconstructed channel state information.

25 Claims, 5 Drawing Sheets

METHOD AND APPARATUS FOR OBTAINING CHANNEL STATE INFORMATION REQUIRED FOR BEAMFORMING

TECHNICAL FIELD

The present invention generally relates to the wireless communication field, and more specifically, to a method and apparatus for obtaining channel state information required for beamforming, as well as a method and apparatus for performing beamforming.

DESCRIPTION OF THE RELATED ART

In multiple-input single-output (MISO) systems, beamforming is an efficient technique to provide both the diversity gain and the array gain in fading channels. Generally, beamforming is implemented at the transmitter side by exploiting the channel state information between the transmitter and the receiver.

For both frequency division duplexing (FDD) and time division duplexing (TDD) systems, the channel state information at the transmitter side is always outdated due to the protocol overhead and time required for baseband processing at both the transmitter and the receiver. Hence, it is necessary to provide accurate channel state information for transmitters in both FDD and TDD systems.

A paper entitled "*Grassmannian predictive coding for delayed limited feedback MIMO systems*" (see Proc. 47th Allerton Conf. Commun., Contr., Comput. Sep. 30-Oct. 2, 2009, pp. 783-788) by T. Inoue and R. W. Heath, Jr. describes such a method that the transmitter and the receiver respectively predict channel state information by using the present and previous channel state information with feedback optimal step size. However, this method contains the following problems:

1. It is not applicable for the case in which the terminal moves at a relatively high speed.
2. It can only predict channel state information after a single feedback period, i.e., one step prediction.
3. It depends on selection of an optimal step size. The receiver needs to feed the determined optimal step size back to the transmitter in order to ensure synchronization of the optimal step size on both sides, and channel state prediction is required at both the transmitter and the receiver. Hence, higher implementation complexity is required.
4. Each of the transmitter and the receiver requires an initial states. Their initial states exert some effect on the convergence of the algorithm, resulting in system instability.

Therefore, there is a need for a method, more widely applied, more accurate, more stable, and less complex than existing ones, for obtaining channel state information required for beamforming and for performing beamforming.

SUMMARY OF THE INVENTION

In view of the above problems in the prior art, the present invention provides a method and apparatus for obtaining channels state information required for beamforming, as well as a method and apparatus for performing beamforming.

According to a first aspect of the present invention, there is provided a method for obtaining channel state information required for beamforming, comprising: estimating current channel state information according to a received signal; predicting future channel state information which is expected to be used by a transmitter in the next beamforming based on the current channel state information and historical channel state information; reading previous channel state information used by the transmitter in the current beamforming; determining feedback information based on the future channel state information and the previous channel state information; and sending the feedback information to the transmitter.

According to a second aspect of the present invention, there is provided a method for performing beamforming, comprising: receiving feedback information from a receiver; reading previous channel state information used in a last beamforming; reconstructing channel state information based on the feedback information and the previous channel state information; and performing beamforming according to the reconstructed channel state information.

According to a third aspect of the present invention, there is provided a receiver for obtaining channel state information required for beamforming, comprising: an estimating device configured to estimate current channel state information according to a received signal; a predicting device configured to predict future channel state information which is expected to be used by a transmitter in the next beamforming, based on the current channel state information and historical channel state information; a reading device configured to read previous channel state information used by the transmitter in the current beamforming; a feedback information determining device configured to determine feedback information based on the future channel state information and the previous channel state information; and a sending device configured to send the feedback information to the transmitter.

According to a fourth aspect of the present invention, there is provided a transmitter for performing beamforming, comprising: a receiving device configured to receive feedback information from a receiver; a reading device configured to read previous channel state information used by the transmitter in the last beamforming; a reconstructing device configured to reconstruct channel state information based on the feedback information and the previous channel state information; and a beamforming device configured to perform beamforming according to the reconstructed channel state information.

The methods of the present invention have the following advantages:

1. They are suitable for the case in which the terminal moves with a relatively high speed, and have a lower overhead.
2. The channel state prediction is not required at the transmitter, but only at the receiver. Hence, the designs of the transmitter and the receiver are decoupled, which reduces the implementation complexity.
3. Depending on the concrete implementation of the prediction, the prediction steps may be set to multiple or fractional of the feedback period and is no longer limited by one feedback period.
4. The re-initialization procedure is introduced so that when the predicted channel state information significantly differs from the actual channel, it may be ensured that the feedback deviation does not increase so that the system has higher reliability.
5. The methods of the present invention do not depend on any specific temporal correlation of the channel and thus are applied more widely.

Furthermore, the methods of the present invention apply to not only multiple-input single-output (MISO) systems but also multiple-input multiple-output (MIMO) systems.

Other features and advantages of the present invention will become more apparent from the following description of preferred embodiments of the present invention, when taken in conjunction with the figures.

BRIEF DESCRIPTION OF THE DRAWINGS

As the present invention is apprehended more thoroughly, other objects and effects of the present invention will become more apparent and easier to understand by means of the following description with reference to the accompanying drawings, wherein.

Like numerals represent the same, similar or corresponding features or functions throughout the figures.

DETAILED DESCRIPTION OF THE PREFERRED EMBODIMENT

Figure 1:
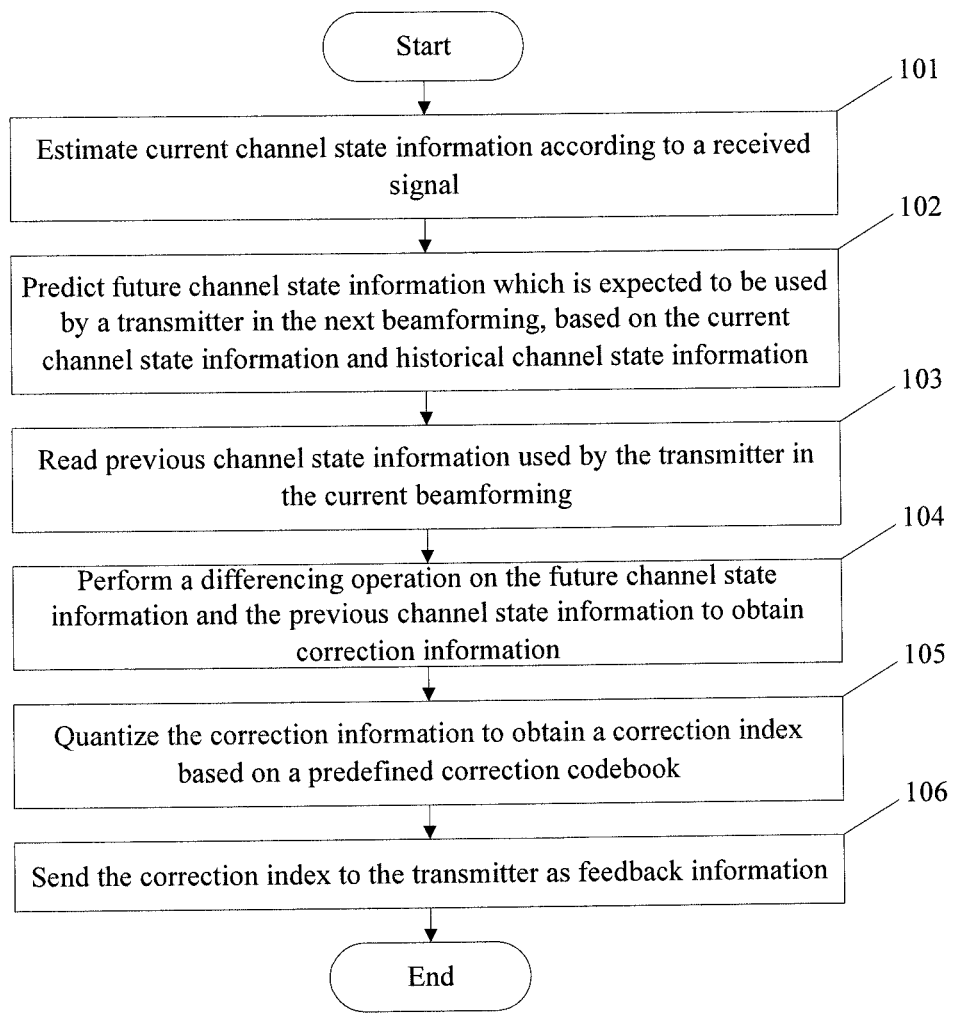
FIG. 1 is a flowchart of a method for obtaining channel state information required for beamforming according to one embodiment of the present invention.

More detailed explanations and illustration will be presented below to the present invention by referring to the figures. It is to be understood that the figures and embodiments of the present invention are merely for illustration, rather than limiting the protection scope of the present invention.

For the purpose of clarity, terms used in the present invention are first explained.

1. Channel State Information

The channel state information is information related to a channel state between a receiver and a transmitter. For example, the channel state information may be channel direction information, signal strength transferred over a channel, etc. The channel direction information may be, e.g., a right singular vector corresponding to a main singular value of a channel matrix. The channel state information may be represented as a vector.

2. Current Channel State Information

Supposing the present instant is instant K, the current channel state information is results from estimating the channel state according to signals received by the receiver from the transmitter at the present instant.

3. Historical Information

Supposing the present instant is instant K, the historical channel state information may comprise one or more pieces of channel state information estimated at instants K−1, K−2, . . . , K−N (wherein N<K). That is, the historical channel state information may be a set of channel state information estimated at previous instants.

4. Future Channel State Information

The future channel state information is channel state information that is predicted by the receiver according to the current channel state information and the historical channel state information. The receiver hopes the transmitter to use the predicted channel state information in the next beamforming, i.e., the beamforming at instant K+1 by the transmitter.

5. Previous Channel State Information

The previous channel state information is channel state information used by the transmitter in the beamforming at the present instant (i.e., instant K). The previous channel state information is stored in a memory or any accessible medium that may be, for example, a magnetic disk, a floppy disk, a CD, a flash memory or other medium conceivable to those skilled in the art, at both the receiver and the transmitter at instant K−1.

The present invention discloses a method for obtaining channel state information required for beamforming. The method may be performed by a receiver and specifically, may comprise the steps of: estimating current channel state information according to a received signal; predicting future channel state information which is expected to be used by a transmitter in the next beamforming based on the current channel state information and historical channel state information; reading previous channel state information used by the transmitter in the current beamforming; determining feedback information based on the future channel state information and the previous channel state information; and sending the feedback information to the transmitter.

The present invention further discloses a method for performing beamforming. The method may be performed by a transmitter and specifically, may comprise the steps of: receiving feedback information from a receiver; reading previous channel state information used in the last beamforming; reconstructing channel state information based on the feedback information and the previous channel state information; and performing beamforming according to the reconstructed channel state information.

With the two methods of the present invention, while the transmitter is transmitting a data signal to the receiver over a communication channel after beamforming, the receiver predicts, from the signal received from the transmitter, a channel state information which is expected to be used by a transmitter in the next beamforming, and sends feedback information over a feedback channel to the transmitter; the transmitter may then reconstruct the channel state information predicted by the receiver, based on the feedback information and use the reconstructed channel state information in the next beamforming, so that the channel state information used in the next beamforming is much closer to the actual channel and the signal transmission is improved. Hence, with the methods of the present invention, the feedback processing from the receiver to the transmitter is made more efficient, less complex and more favorable to high-precision beamforming than the prior art.

In the present invention, the procedure of reconstructing channel state information based on the feedback information and the previous channel state information may be implemented using a predefined codebook. The predefined codebook may be a predefined correction codebook for correcting the feedback processing or an initial codebook for re-initializing the feedback processing. Of course, those skilled in the art may design a predefined codebook based on some known codebook designs or priori knowledge. The predefined codebook may be a fixed codebook or a variable codebook.

That the predefined codebook is a variable codebook means that for one feedback, the transmitter and the receiver must use the same correction codebook. For example, a random vector quantization (RVQ) codebook is constructed based on the same pseudo random number generator and the same initial state. For different feedback, the predefined codebook does not necessarily remain fixed, but may be synchronously, dynamically updated based on a certain rule pre-agreed between the transmitter and the receiver.

When such a variable predefined codebook is used, predefined codebooks at the receiver and the transmitter need to be kept in conformity in one feedback, so that it is ensured that feedback information is of the same meaning to both the transmitter and the receiver in one feedback.

Hereinafter, embodiments shown in FIGS. 1 and 2 respectively illustrates a method for obtaining, by a receiver, channel state information required for beamforming, and embodiments shown in FIGS. 3 and 4 respectively illustrates a method for performing beamforming. Then, with reference to FIG. 5, an introduction is presented to a communication system where the receiver and the transmitter are located and to structures of the receiver and the transmitter.

FIG. 1 is a flowchart of a method for obtaining channel state information required for beamforming according to one embodiment of the present invention. In the embodiment illustrated in FIG. 1, a receiver may determine a feedback signal through the following feedback correction processing: first of all, correction information is obtained by performing a differencing operation on future channel state information and previous channel state information; then, the obtained correction information is quantized according to a predefined correction codebook, for obtaining a correction index; finally, the obtained correction index is determined as feedback information so as to be sent. Specific steps of the embodiment illustrated in FIG. 1 are introduced below.

In step 101, current channel state information is estimated according to a received signal.

In a communication system involved in the present invention, a transmitter sends a signal to a receiver over a communication channel after beamforming. The receiver obtain estimation of the present channel direction information, by estimating a channel coefficient matrix using a pilot sequence, a reference signal or a training sequence in the signal received from the communication channel. A method for estimating the channel coefficient matrix may be a minimum mean square error (MMSE) estimate, a least square (LS) estimate, a recursive least square (RLS) estimate, etc.

In one embodiment, supposing the present instant is instant K, the receiver may store in a memory the estimated current channel state information corresponding to instant K. Channel state information corresponding to instants $1, 2, \ldots, K-1$ before instant K may be stored in the memory likewise. In the present invention, the channel state information corresponding to the first, the instants $1, 2, \ldots, K-1$ as stored in the memory is referred to as historical channel state information.

In step 102, future channel state information which is expected to be used by the transmitter in the next beamforming is predicted based on the current channel state information and the historical channel state information.

In the prior art there exist various solutions for predicting future channel state information based on the current channel state information and the historical channel state information, such as Wiener filtering-based minimum mean square error (MMSE) prediction, Kalman filtering-based prediction, recursive least square (RLS)-based prediction, geodesic prediction based on differentiable Riemannian manifold upper-tangent vector parallel transport, etc.

The future channel state information obtained by the receiver from the prediction is channel state information which is expected to be used by the transmitter in the next beamforming, so that parameters to be used by the transmitter in beamforming at instant K+1 better conform to an actual channel state and have higher precision.

In step 103, previous channel state information used by the transmitter in the current beamforming is read.

The previous channel state information is channel state information which is predicted in step 102 by the receiver according to data received at instant K−1, and which was expected by the receiver to be used in the current beamforming by the transmitter. After the prediction of the previous channel state information, it may be stored in a memory of the receiver and used to update previously predicted channel state information which had been stored in the memory.

Hence, it is possible to read previous channel state information from a memory in step 103, the previous channel state information being channel state information used by the transmitter in the current beamforming. Note that for better understanding, the present invention does not explicitly describe quantization error and transmission error, but omits some technical details that are well known to those skilled in the art and that might be essential to the implementation of the present invention.

In step 104, a differencing operation is performed on the future channel state information and the previous channel state information, to obtain correction information.

In the present invention, the concept "differencing operation" does not simply mean subtraction but indicates the difference between two objects on which a differencing operation is to be performed. By way of example, three examples of differencing operations are given as below. It is to be understood that those skilled in the art may perform a differencing operation using any suitable method according to the prior art and common knowledge, without being limited to the examples disclosed here.

Supposing x and y are two vectors representing the future channel state information and the previous channel state information respectively, wherein $x, y \in C^M$, the difference between x and y may be defines as any one of (1)-(3).

(1) Difference defined in M-dimensional complex vector space:

$z = y - x$, wherein $z \in C^M$.

(2) Householder reflection matrix from vector x to vector y:

$$H \in U_{M \times M}, H = I - \frac{uu^H}{x^H u}, \text{ where } u = x - y.$$

(3) Tangent vector from point x to point y along the geodesic direction on M-dimensional differentiable Riemannian manifold:

$$e \in C^M \ e \in C^M, e = (y \ x)\left(\frac{\theta|\rho|}{d\rho} \ -\frac{\theta|\rho|}{d}\right)^T, \text{ where}$$

$$\rho = x^H y, d = \sqrt{1 - |\rho|^2}, \theta = \arccos |\rho|.$$

Where, x and y are vectors on which a differencing operation is to be performed;

z, H and e are results from the above three differencing operations;

I represents a unit matrix;

$C^M$ represents M-dimensional complex vector space;

$U_{M \times M}$ represents a set of all M-dimensional unitary matrices;

$(\cdot)^T$ represents the transpose of matrix/vector; and $(\cdot)^H$ represents the conjugate transpose of matrix/vector.

Through the above differencing operations, correction information may be obtained based on the future channel state information and the previous channel state information.

In step 105, the correction information is quantized to obtain a correction index according to a predefined correction codebook.

In the present invention, the correction codebook may be predefined. For example, it may be designed with respect to the quantization of the correction information by those skilled in the art according to some codebook designs or priori knowledge.

Before performing the method of the present invention, both the transmitter and the receiver save completely the same predefined correction codebook; that is, the transmitter and the receiver learn in advance the same correction codebook. In this manner, after the receiver quantizes the correction information to obtain a correction index according to a correction codebook, the transmitter can inverse-quantize the correction index to obtain the correction information according to the same predefined correction codebook.

In one embodiment, quantizing the correction information to obtain a correction index may be implemented by determining from a predefined correction codebook a codeword corresponding to the correction formation and then determining an index of the codeword as a correction index. In addition, the quantization processing may also be implemented in a manner that is well known to those skilled in the art.

Through steps 104 and 105, feedback information can be determined based on the future channel state information and the previous channel state information.

In step 106, the correction index is sent to the transmitter as feedback information.

In addition, the receiver may obtain correction information based on the correction index, reconstructs the future channel state information by using the correction information and the previous channel state information, and updates the previous channel state information with the reconstructed future channel state information. In this regard, steps 215-217 in FIG. 2 present an exemplary embodiment.

Figure 2:
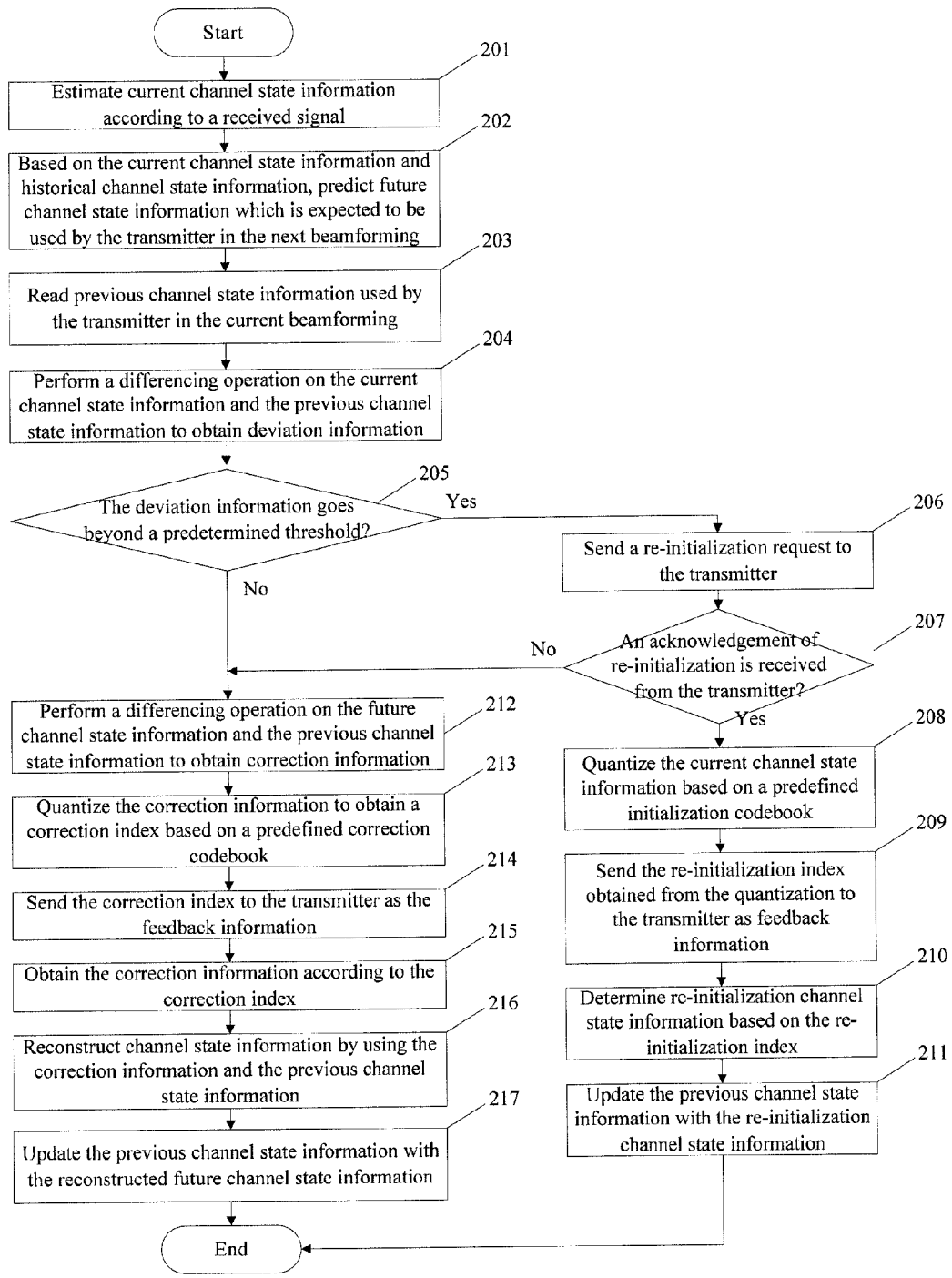
FIG. 2 is a flowchart of a method for obtaining channel state information required for beamforming according to another embodiment of the present invention.

FIG. 2 is a flowchart of a method for obtaining channel state information required for beamforming according to another embodiment of the present invention. In the embodiment illustrated in FIG. 2, deviation correction measures are introduced to the determination of feedback information, in order to obtain channel state information that better conform to an actual channel. Specifically, in this embodiment a differencing operation is performed on the current channel state information and the previous channel state information to obtain deviation information, and a re-initialization is performed when the deviation information goes beyond a predetermined threshold. Hence, when the channel direction predicted presently is quite inaccurate in relation to the current channel state information predicted according to a received signal or significantly deviates from an actual channel state, the receiver may judge the deviation degree according to the obtained deviation information, so as to perform correction in time and avoid larger prediction error.

When the receiver determines that the obtained deviation information goes beyond the predetermined threshold, a re-initialization request is sent to the transmitter; after receiving from the transmitter an acknowledgement of re-initialization, the current channel state information is quantized based on a predefined initialization codebook; a re-initialization index obtained from the quantization is determined as the feedback information. After such re-initialization is completed, the feedback information sent to the transmitter is reset, i.e., being corrected from larger error to be closer to an actual situation, so that it is more favorable for the transmitter to perform the next beamforming. In addition, the receiver may determine re-initialization channel state information according to the re-initialization index and update the previous channel state information with the re-initialization channel state information.

When the receiver determines that the obtained deviation information does not go beyond the predetermined threshold, a correction index may be determined as the embodiment illustrated in FIG. 1 and the correction index is determined as the feedback information.

Steps of the embodiment illustrated in FIG. 2 are introduced below.

In step 201, current channel state information is estimated according to a received signal.

In step 202, future channel state information which is expected to be used by the transmitter in the next beamforming is predicted based on the current channel state information and historical channel state information.

In step 203, previous channel state information used by the transmitter in the current beamforming is read.

The implementation of steps 201-203 is similar to that of steps 101-103 in the embodiment illustrated in FIG. 1 and thus is not detailed here.

In step 204, a differencing operation is performed on the current channel state information and the previous channel state information to obtain deviation information.

Step 104 in the embodiment illustrated in FIG. 1 provides three examples of "differencing operations." Although in step 204 a differencing operation is also performed, step 204 differs from step 104 in that the current channel state information and the previous channel state information are subjected to a differencing operation.

In one embodiment, if a difference between the current channel state information and the previous channel state information (supposing x and y) is obtained according to any one of "differencing operations" (1)-(3), deviation information $\epsilon$ between x and y may be calculated by any one of following approaches (1)-(3):

$$\|z\|, \quad (1)$$

$$\|H-I\|_F, \quad (2)$$

$$\|e\|. \quad (3)$$

Where vector norms in (1) and (3) are not limited to 2-norm of a vector.

It is to be understood that the calculation of deviation information in (1)-(3) corresponds to the differencing operations in examples (1)-(3) in step 104, respectively.

In another embodiment, a "difference" between $x_i$ and $y_i$ may be calculated, where $i \in I_{n,P} = \{n, n-1, \ldots, n-P\}$, and P order deviation information between $\{x_i\}_{i \in I_{n,P}}$ and $\{y_i\}_{i \in I_{n,P}}$ may be taken as the deviation information obtained in step 204. Three exemplary embodiments of calculating the P order deviation information are presented below:

$$\varepsilon = \left(\sum_{i \in I_{n,P}} \alpha_i \varepsilon_i^r\right)^{1/r}, \text{ wherein } r \in N, \alpha_i R, \sum_{i \in I_{n,P}} \alpha_i = 1, \quad (1)$$

and $\epsilon_i$ is deviation information of $x_i$ and $y_i$.

$$\varepsilon = \frac{1}{P} \sum_{i \in I_{n,P}} I(\varepsilon_i > \tau_i), \quad (2)$$

wherein $\tau_i$ is a preset threshold, I(A) is an indicative function of event A, and $\epsilon_i$ is deviation information of xi and yi.

$$\varepsilon = \det S \left( \frac{M+1}{trS} \right)^{M+1}, \text{ wherein } S = \frac{1}{P} \sum_{i \in I_{n,P}} H_i. \quad (3)$$

Wherein,

N represents a field of natural numbers;

R represents a field of real numbers;

det S represents a determinant of matrix S;

tr S represents a trace of matrix S;

$\|x\|$ represents a norm of vector x and unless otherwise specified, refers to 2-norm of a vector;

$\|X\|_F$ represents a Frobenius norm of matrix x.

It is to be understood that those skilled in the art may calculate the deviation information using any known method and in a manner corresponding to the differencing operation, without limitation to the examples disclosed here.

In step 205, it is judged whether the deviation information goes beyond a predetermined threshold.

The predetermined threshold may be preset by those skilled in the art according to the prior art or priori knowledge.

When the deviation information goes beyond the predetermined threshold, the flow goes to step 206; otherwise the flow goes to step 212 for feedback correction processing.

In step 206, a re-initialization request is sent to the transmitter.

In step 207, it is judged whether an acknowledgement of re-initialization is received from the transmitter.

After the receiver receives from the transmitter the acknowledgement of re-initialization, the flow goes to step 208 for re-initialization processing; if the receiver does not receive from the transmitter the acknowledgement of re-initialization, the flow goes to step 212 for feedback correction processing.

In step 208, the current channel state information is quantized based on a predefined initialization codebook.

In the present invention, the initialization codebook may be predefined. For example, it may be designed for the quantization of the correction information by those skilled in the art according to some known codebook designs or priori knowledge.

Before performing the method of the present invention, both the transmitter and the receiver save completely the same predefined initialization codebook; that is, the transmitter and the receiver learn in advance the same initialization codebook. In this manner, only after the receiver quantizes the current channel state information to obtain a re-initialization index according to the initialization codebook, can the transmitter inverse-quantize the re-initialization index according to the same predefined initialization codebook and thereby obtain channel state information that will be required after the re-initialization.

In one embodiment, quantizing the current channel state information may be implemented by determining from a predefined initialization codebook a codeword corresponding to the current channel state formation and then determining an index of the codeword as a re-initialization index. In addition, the quantization processing may also be implemented in a manner that is well known to those skilled in the art.

In step 209, the re-initialization index obtained from the quantization is sent to the transmitter as feedback information.

In step 210, re-initialization channel state information is determined based on the re-initialization index.

This step and the quantization step 208 are inverse, i.e., in this step, the re-initialization index is inverse-quantized to determine re-initialization channel state information based on the predefined initialization codebook. For example, a matching codeword may be looked up in the initialization codebook based on the re-intializaiton index and determined as re-initialization channel state information.

In step 211, the previous channel state information is updated with the re-initialization channel state information.

For example, the re-initialization channel state information may be stored in a memory to replace the previous channel state information that was previously stored in the memory.

It is to be understood that those skilled in the art would readily appreciate from the content of the present invention that the re-initialization channel state information for updating the previous channel state information in step 210 may be obtained in step 201 directly and is not necessarily obtained in steps 210 and 211. If the current channel state information, i.e., the re-initialization channel state information is obtained in step 201 directly, it can be then directly used to replace the previous channel state information in the memory, thereby completing update processing.

In step 212, a differencing operation is performed on the future channel state information and the previous channel state information to obtain correction information.

In step 213, the correction information is quantized to obtain a correction index based on a predefined correction codebook.

In step 214, the correction index is sent to the transmitter as feedback information.

The implementation of steps 212-214 is similar to that of steps 104-106 in the embodiment illustrated in FIG. 1 and thus is not detailed here.

In step 215, the correction information is obtained based on the correction index.

This step and the quantization step 213 are inverse, i.e., in step 215, inverse-quantizing the re-initialization index to determine the correction information based on the predefined correction codebook. For example, a matching codeword may be looked up in the correction codebook based on the correction index and determined as the correction information.

In step 216, the future channel state information is reconstructed by using the correction information and the previous channel state information.

Since in step 212 the correction information is obtained by performing a differencing operation on the future channel state information and the previous channel state information, the future channel state information may be reconstructed from the correction information and the previous channel state information by an inverse operation (referred to as a "summing operation" in the present invention) of the differencing operation.

In the present invention, the concept "summing operation" does not simply mean addition but indicates the sum of two objects on which a summing operation is to be performed. Corresponding to the three examples of "differencing operations" as set forth in step 104 in the embodiment illustrated in FIG. 1, presented below are three examples of summing operations. It is to be understood that as long as a summing operation corresponds to the differencing operation, those skilled in the art may perform the summing operation using any proper method according to the prior art and common knowledge, without being limited to the examples disclosed here.

The "summing operation" of the difference between x and y may be defined as below:

$$y = x + z, \quad (1)$$

$$y = H^H x, \quad (2)$$

$$y = \left(x \quad \frac{e}{\|e\|}\right)(\sin\|e\| \quad \cos\|e\|)^T. \quad (3)$$

Where $\|x\|$ represents 2-norm of vector x.

It can be seen that by using the summing operation that is an inverse operation of the differencing operation in step 204, the future channel state information may be reconstructed based on the correction information and the previous channel state information in step 216.

In step 217, the previous channel state information is updated with the reconstructed future channel state information.

For example, the reconstructed future channel state information may be stored in a memory to replace the previous channel state information that was previously stored in the memory.

It is to be understood that those skilled in the art would readily appreciate from the content of the present invention that the future channel state information for updating the previous channel state information in step 217 may be directly obtained in step 202, rather than necessarily obtained from the reconstruction procedure in steps 215 and 216. If the future channel state information is directly obtained in step 202, it is then used to replace the previous channel state information in the memory, thereby completing update processing.

Figure 3:
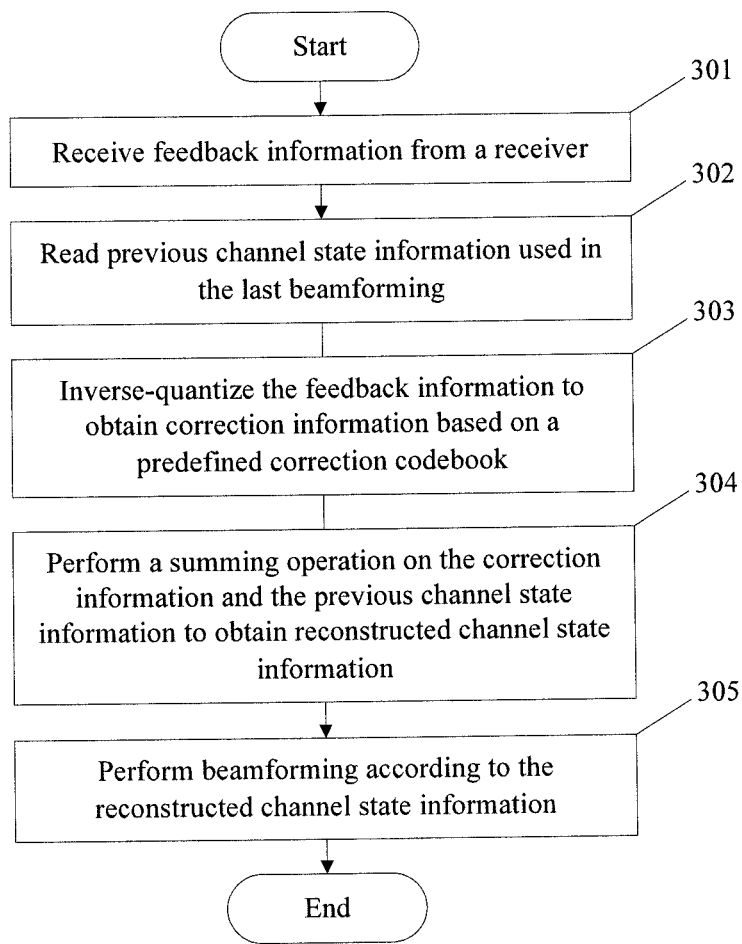
FIG. 3 is a flowchart of a method for performing beamforming according to one embodiment of the present invention.
Figure 4:
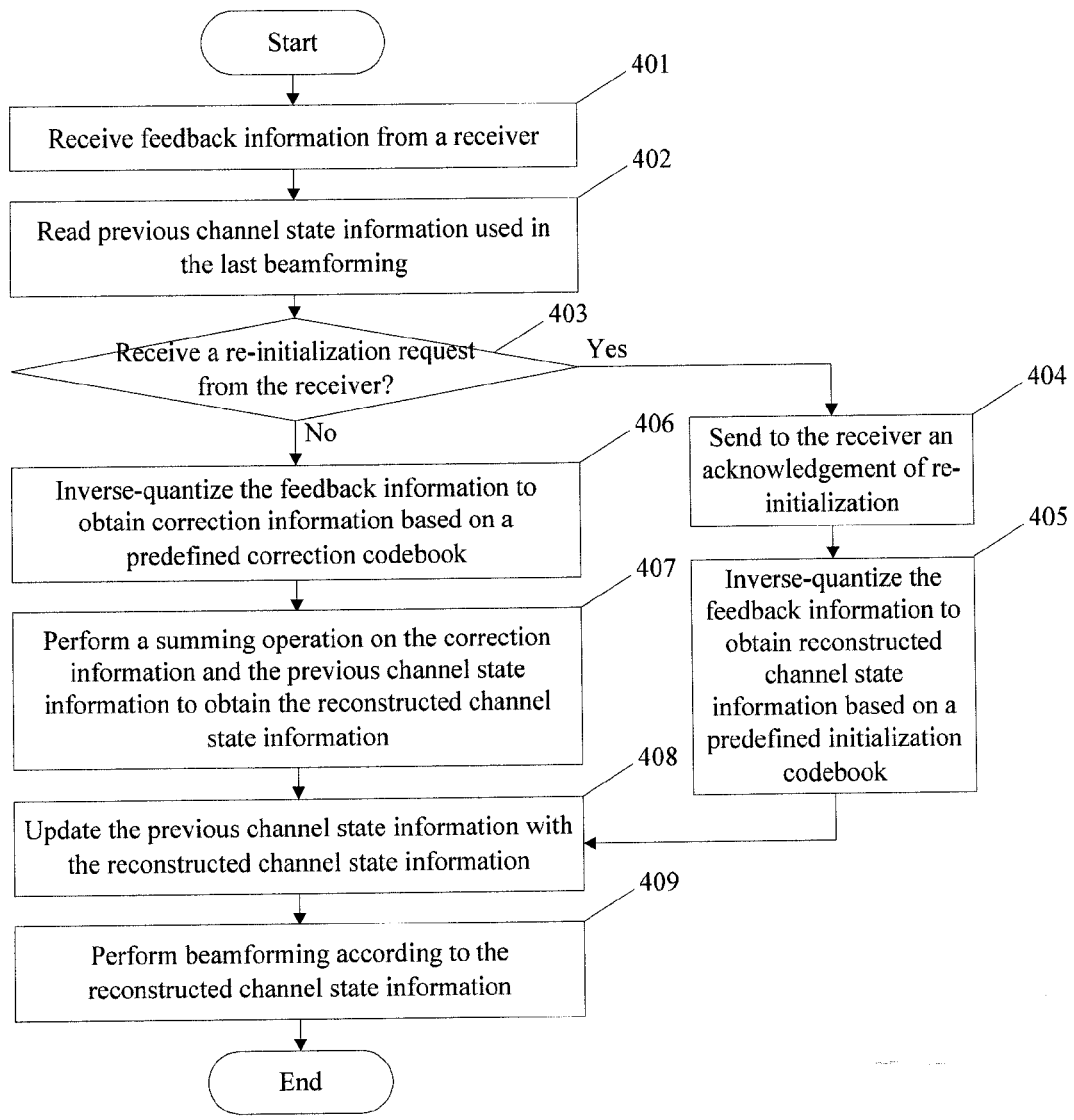
FIG. 4 is a flowchart of a method for performing beamforming according to another embodiment of the present invention.

FIGS. 3 and 4 illustrate two respective embodiments of the transmitter performing beamforming. The difference is that the embodiment of FIG. 3 describes the transmitter performing beamforming based on a correction index fed back by the embodiment of FIG. 1, and the embodiment of FIG. 4 describes the transmitter performing beamforming based on a re-initialization signal or a correction index fed back by the embodiment of FIG. 2.

FIG. 3 is a flowchart of a method for performing beamforming according to one embodiment of the present invention.

In step 301, feedback information is received from the receiver.

The feedback information may be feedback information sent from the receiver to the transmitter in step 106 in the embodiment of FIG. 1.

In step 302, previous channel state information used in the last beamforming is read.

Note that the last beamforming for the transmitter and the present beamforming for the receiver are the same beamforming, and they are simply different in expression but substantially identical.

Every time the transmitter performs beamforming, it may store in a memory channel state information used in the present beamforming and use the information to update channel state information used in the last beamforming. Hence, channel state information used in the last beamforming may be read from the memory in step 302, which is referred to as previous channel state information here.

In step 303, the feedback information is inverse-quantized to obtain correction information based on a predefined correction codebook.

The inverse quantization in this step may be an inverse operation of the quantization in step 105 in the embodiment of FIG. 1. For example, a matching codeword may be looked up in a predefined correction codebook based on a correction index and determined as the correction information.

In step 304, a summing operation is performed on the correction information and the previous channel state information to obtain reconstructed channel state information.

This step is similar to step 216 in the embodiment of FIG. 2. The channel state information may be reconstructed based on the correction information and the previous channel state information by using any of the examples of the summing operations as set forth in step 216 or other method that is known to those skilled in the art.

It is to be understood that the reconstructing channel state information based on the feedback information and the previous channel state information in steps 303 and 304 is merely an implementation of the present invention, and those skilled in the art may use any other possible implementations according to the disclosure of the present invention.

In step 305, beamforming is performed according to the reconstructed channel state information.

The reconstructed channel state information corresponds to the future channel state information predicted in step 102 in the embodiment of FIG. 1. Hence, the transmitter may use the channel state information which the receiver expects the transmitter to use in the present beamforming (the next beamforming from the perspective of the transmitter prediction procedure).

In addition, in the embodiment of FIG. 3, after the reconstructed channel state information is obtained, it may be further used to update the previous channel state information.

FIG. 4 is a flowchart of a method for performing beamforming according to another embodiment of the present invention. Unlike the embodiment of FIG. 3, the embodiment of FIG. 4 involves error correction measures in the embodiment of FIG. 2. As described by the embodiment of FIG. 2, if the receiver determines that the obtained deviation information goes beyond the predetermined threshold, a re-initialization request may be sent to the transmitter. For the transmitter, it may monitor whether a re-initialization request is received from the receiver; upon receipt of the re-initialization request, the transmitter may send to the receiver an acknowledgement of re-initialization, and inverse-quantize the feedback information to obtain reconstructed channel state information based on the predefined initialization codebook. If no re-initialization request is received, then just like the embodiment of FIG. 3, the feedback is inverse-quantized to obtain correction information based on a predefined correction codebook, and a summing operation is performed on the correction information and the previous channel state information to obtain the reconstructed channel state information. In addition, no matter whether the re-initialization request is received, the transmitter may update the previous channel state information with the reconstructed channel state information.

In step 401, feedback information is received from the receiver.

The feedback information may be feedback information sent from the receiver to the transmitter in step 209 or 214 in the embodiment of FIG. 2, and it may be a correction index or a re-initialization index.

In step 402, previous channel state information used in the last beamforming is read.

This step is similar to step 302 and thus is not detailed here.

In step 403, it is monitored whether a re-initialization request is received from the receiver.

If the transmitter monitors that the receiver sends to it the re-initialization request, the flow goes to step 404 of processing the feedback information as a re-initialization index; and if the transmitter does not monitor the re-initialization request, the flow goes to step 406 of processing the feedback information as a correction index.

In step 404, an acknowledgement of re-initialization is sent to the receiver.

In step 405, the feedback information is inverse-quantized to obtain reconstructed channel state information based on a predefined initialization codebook.

In this step, the feedback information is a re-initialization index. The inverse quantization of the re-initialization index is an inverse operation of the quantization in step 208 in the embodiment of FIG. 2. For example, a matching codeword may be looked up in the predefined initialization codebook according to the re-initialization index and determined as the reconstructed channel state information.

In step 406, the feedback information is inverse-quantized to obtain correction information based on a predefined correction codebook.

In step 407, a summing operation is performed on the correction information and the previous channel state information to obtain the reconstructed channel state information.

Steps 406 and 407 are similar to steps 303 and 304 in FIG. 3, respectively, and thus are not detailed here.

In step 408, the previous channel state information is updated with the reconstructed channel state information.

For example, the reconstructed channel state information may be stored in a memory where the previous channel state information is located. The previous channel state information may be updated by the reconstructed channel state information, and then the update processing is completed.

In step 409, beamforming is performed according to the reconstructed channel state information.

Figure 5:
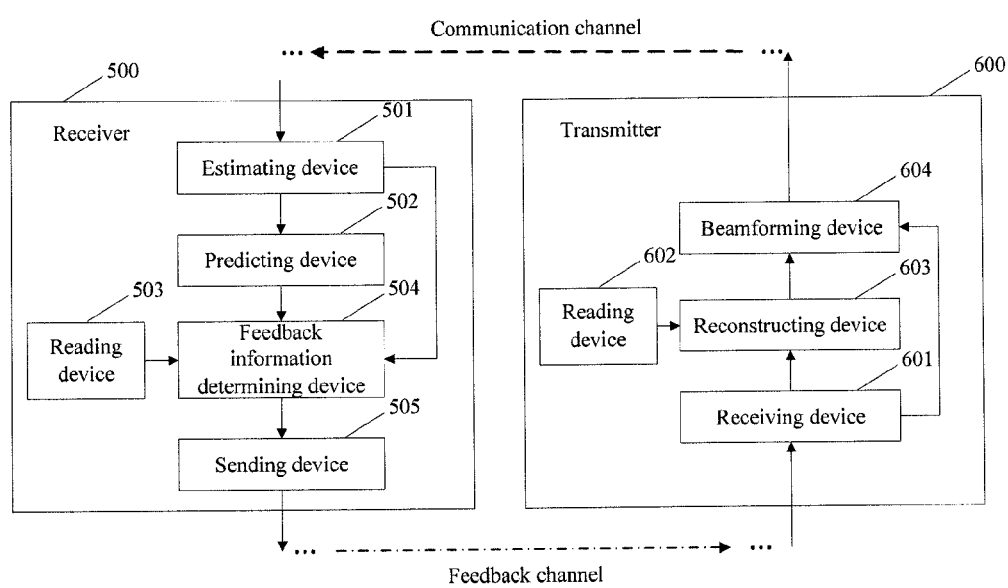
FIG. 5 is block diagrams of a receiver for obtaining channel state information required for beamforming and a transmitter for performing beamforming according to one embodiment of the present invention.

FIG. 5 is block diagrams of a receiver 500 for obtaining channel state information required for beamforming and a transmitter 600 for performing beamforming according to one embodiment of the present invention. FIG. 5 further illustrates a schematic view of communication between the receiver 500 and the transmitter 600. The transmitter 600 transmits a signal (e.g., a data signal, a control signal, etc.) to the receiver via a communication channel after beamforming; the receiver 500 determines channel state information which the receiver expects the transmitter to use in the next beamforming, according to the signal received from the transmitter 600, and sends the channel state information in the form of feedback information to the transmitter 600 over a feedback channel, so that the transmitter 600 may adjust beamforming parameters in time to improve the beamforming precision.

The receiver 500 may comprise: an estimating device 501, a predicting device 502, a reading device 503, feedback information determining device 504, and a sending device 505.

The estimating device 501 is configured for estimating current channel state information according to a received signal;

The predicting device 502 is configured for predicting future channel state information which is expected to be used by a transmitter in the next beamforming, based on the current channel state information and historical channel state information;

The reading device 503 is configured for reading previous channel state information used by the transmitter in the current beamforming;

The feedback information determining device 504 is configured for determining feedback information based on the future channel state information and the previous channel state information.

The sending device 505 is configured for sending the feedback information to the transmitter.

In one embodiment, the feedback information determining device 504 may comprise: means for performing a differencing operation on the future channel state information and the previous channel state information to obtain correction information; means for quantizing the correction information based on a predefined correction codebook to obtain a correction index; and means for determining the correction index as the feedback information.

In a second embodiment, besides the above three means, the feedback information determining device 504 may further comprise: means for obtaining correction information according to the correction index; means for reconstructing the future channel state information by using the correction information and the previous channel state information; and means for updating the previous channel state information with the reconstructed future channel state information.

In a third embodiment, the feedback information determining device 504 may comprise: a deviation information calculating unit for performing a differencing operation on the current channel state information and the previous channel state information to obtain deviation information; and a re-initialization determining unit for determining to perform re-initialization when the deviation information goes beyond a predetermined threshold.

For example, the re-initialization determining unit may comprise: means for sending a re-initialization request to the transmitter; means for quantizing the current channel state information based on a predefined initialization codebook, after receiving from the transmitter an acknowledgement of re-initialization; and means for determining a re-initialization index obtained from the quantization as the feedback information. For another example, besides the above three means, the re-initialization determining unit may further comprise: means for determining re-initialization channel state information according to the re-initialization index; and means for updating the previous channel state information with the re-initialization channel state information.

In the third embodiment, when the deviation information does not go beyond the predetermined threshold, the feedback information determining device 504 may comprise: means for performing a differencing operation on the future channel state information and the previous channel state information to obtain correction information; means for quantizing the correction information based on a predefined correction codebook to obtain a correction index; and means for determining the correction index as the feedback information. In addition, the feedback information determining device 504 may further comprise: means for obtaining correction information according to the correction index; means for reconstructing the future channel state information by using the correction information and the previous channel state information; and means for updating the previous channel state information with the reconstructed future channel state information.

The transmitter 600 may comprise: a receiving device 601, a reading device 602, a reconstructing device 603, and a beamforming device 604.

The receiving device 601 is configured for receiving feedback information from a receiver.

The reading device 602 is configured for reading previous channel state information used by the transmitter in the last beamforming.

The reconstructing device 603 is configured for reconstructing channel state information based on the feedback information and the previous channel state information.

The beamforming device 604 is configured for performing beamforming according to the reconstructed channel state information.

In one embodiment, the reconstructing device 603 may comprise: means for inverse-quantizing the feedback information based on a predefined correction codebook to obtain correction information; and means for performing a summing operation on the correction information and the previous channel state information to obtain the reconstructed channel state information.

In another embodiment, the reconstructing device 603 may further comprise: means for monitoring whether a re-initialization request is received from the receiver; means for sending to the receiver an acknowledgement of re-initialization upon receipt of the re-initialization request; and means for inverse-quantizing the feedback information based on a predefined initialization codebook to obtain the reconstructed channel state information upon receipt of the re-initialization request. In this embodiment, if the means, in the reconstructing device 603, for monitoring whether a re-initialization request from the receiver is received monitors no re-initialization request from the receiver, the reconstructing device 603 may further comprise: means for inverse-quantizing the feedback information based on a predefined correction codebook to obtain correction information; and means for performing a summing operation on the correction information and the previous channel state information to obtain the reconstructed channel state information.

In addition, the transmitter 600 may comprise: an updating device for updating the previous channel state information with the reconstructed channel state information.

The methods of the present invention can be implemented in software, hardware or combination of software and hardware. The hardware portion can be implemented by using dedicated logic; the software portion can be stored in a memory and executed by an appropriate instruction executing system such as a microprocessor, a personal computer (PC) or a mainframe computer.

It should be noted that some more specific technical details that are well known to those skilled in the art and that might be essential to the implementation of the present invention are omitted in the above description in order to make the present invention more easily understood.

The specification of the present invention has been presented for purposes of illustration and description, and is not intended to be exhaustive or limited to the invention in the form disclosed. Many modifications and variations will be apparent to those of ordinary skill in the art.

Therefore, the embodiments were chosen and described in order to best explain the principles of the invention and the practical application, and to enable others of ordinary skill in the art to understand that all modifications and alterations made without departing from the spirit of the present invention fall into the protection scope of the present invention as defined in the appended claims.

What is claimed is:

1. A method for obtaining channel state information required for beamforming, comprising:
    estimating current channel state information according to a received signal;
    predicting future channel state information which is expected to be used by a transmitter in the next beamforming, based on the current channel state information and historical channel state information;
    reading previous channel state information used by the transmitter in the current beamforming;
    determining feedback information based on the future channel state information and the previous channel state information; and
    sending the feedback information to the transmitter.

2. The method according to claim 1, wherein the step of determining the feedback information based on the future channel state information and the previous channel state information comprises:
    performing a differencing operation on the future channel state information and the previous channel state information to obtain correction information;
    quantizing the correction information based on a predefined correction codebook to obtain a correction index; and
    determining the correction index as the feedback information.

3. The method according to claim 2, further comprising:
    obtaining correction information according to the correction index;
    reconstructing the future channel state information by using the correction information and the previous channel state information; and
    updating the previous channel state information with the reconstructed future channel state information.

4. The method according to claim 2, wherein the step of determining the feedback information based on the future channel state information and the previous channel state information comprises:
    performing a differencing operation on the current channel state information and the previous channel state information to obtain deviation information; and
    determining to perform re-initialization when the deviation information goes beyond a predetermined threshold.

5. The method according to claim 4, wherein the step of determining to perform re-initialization when the deviation degree goes beyond the predetermined threshold comprises:
    sending a re-initialization request to the transmitter;
    quantizing the current channel state information based on a predefined initialization codebook, responsive to receiving from the transmitter an acknowledgement of re-initialization; and
    determining a re-initialization index obtained from the quantization as the feedback information.

6. The method according to claim 5, further comprising:
    determining re-initialization channel state information according to the re-initialization index; and
    updating the previous channel state information with the re-initialization channel state information.

7. The method according to claim 1, wherein the channel state information is channel direction information.

8. A method for performing beamforming, comprising:
    receiving feedback information from a receiver;
    reading previous channel state information used in a last beamforming;
    reconstructing channel state information based on the feedback information and the previous channel state information; and
    performing beamforming according to the reconstructed channel state information.

9. The method according to claim 8, wherein the step of reconstructing the channel state information based on the feedback information and the previous channel state information comprises:
    inverse-quantizing the feedback information based on a predefined correction codebook to obtain correction information; and
    performing a summing operation on the correction information and the previous channel state information to obtain the reconstructed channel state information.

10. The method according to claim 8, further comprising:
    updating the previous channel state information with the reconstructed channel state information.

11. The method according to claim 8, wherein the step of reconstructing the channel state information based on the feedback information and the previous channel state information comprises:
    monitoring whether a re-initialization request is received from the receiver; and
    upon receipt of the re-initialization request, sending to the receiver an acknowledgement of re-initialization, and inverse-quantizing the feedback information based on a predefined initialization codebook to obtain the reconstructed channel state information.

12. The method according to claim 8, wherein the channel state information is channel direction information.

13. The method of claim 8, wherein the feedback information is determined based the previous channel state information and future channel state information predicted by using current channel state information and historical channel state information.

14. A receiver for obtaining channel state information required for beamforming, comprising:
    an estimating device configured to estimate current channel state information according to a received signal;
    a predicting device configured to predict future channel state information which is expected to be used by a transmitter in the next beamforming, based on the current channel state information and historical channel state information;
    a reading device configured to read previous channel state information used by the transmitter in the current beamforming;
    a feedback information determining device configured to determine feedback information based on the future channel state information and the previous channel state information; and
    a sending device configured to send the feedback information to the transmitter.

15. The receiver according to claim 14, wherein the feedback information determining device comprises:
    means for performing a differencing operation on the future channel state information and the previous channel state information to obtain correction information;
    means for quantizing the correction information based on a predefined correction codebook to obtain a correction index; and
    means for determining the correction index as the feedback information.

16. The receiver according to claim 15, wherein the feedback information determining device comprises:
    means for obtaining correction information according to the correction index;
    means for reconstructing the future channel state information by using the correction information and the previous channel state information; and
    means for updating the previous channel state information with the reconstructed future channel state information.

17. The receiver according to claim 14, wherein the feedback information determining device comprises:
    a deviation information calculating unit configured to perform a differencing operation on the current channel state information and the previous channel state information to obtain deviation information; and
    a re-initialization determining unit configured to determine to perform re-initialization when the deviation information goes beyond a predetermined threshold.

18. The receiver according to claim 17, wherein the re-initialization determining unit comprises:
    means for sending a re-initialization request to the transmitter;
    means for quantizing the current channel state information based on a predefined initialization codebook, responsive to receiving from the transmitter an acknowledgement of re-initialization; and
    means for determining a re-initialization index obtained from the quantization as the feedback information.

19. The receiver according to claim 18, wherein the re-initialization determining unit further comprises:
    means for determining re-initialization channel state information according to the re-initialization index; and
    means for updating the previous channel state information with the re-initialization channel state information.

20. The receiver according to claim 14, wherein the channel state information is channel direction information.

21. A transmitter for performing beamforming, comprising:
    a receiving device configured to receive feedback information from a receiver;
    a reading device configured to read previous channel state information used by the transmitter in a last beamforming;
    a reconstructing device configured to reconstruct channel state information based on the feedback information and the previous channel state information; and
    a beamforming device configured to perform beamforming according to the reconstructed channel state information.

22. The transmitter according to claim 21, wherein the reconstructing device comprises:
    means for inverse-quantizing the feedback information based on a predefined correction codebook to obtain correction information; and
    means for performing a summing operation on the correction information and the previous channel state information to obtain the reconstructed channel state information.

23. The transmitter according to claim 21, further comprising:
    an updating device configured to update the previous channel state information with the reconstructed channel state information.

24. The transmitter according to claim 21, wherein the reconstructing device comprises:
    means for monitoring whether a re-initialization request is received from the receiver;
    means for sending to the receiver an acknowledgement of re-initialization upon receipt of the re-initialization request; and
    means for, upon receipt of the re-initialization request, inverse-quantizing the feedback information based on a predefined initialization codebook to obtain the reconstructed channel state information.

25. The transmitter according to claim 21, wherein the channel state information is channel direction information.

* * * * *

UNITED STATES PATENT AND TRADEMARK OFFICE
CERTIFICATE OF CORRECTION

PATENT NO. : 8,879,655 B2  
APPLICATION NO. : 13/216676  
DATED : November 4, 2014  
INVENTOR(S) : Ming Lei, Yu Zhang and Ye Wu Page 1 of 1

It is certified that error appears in the above-identified patent and that said Letters Patent is hereby corrected as shown below:

In the Specification

Column 8, Line 62: delete "$\alpha_i R$," and insert -- $\alpha_i \in R$, --

Signed and Sealed this  
Twenty-third Day of June, 2015

Michelle K. Lee  
*Director of the United States Patent and Trademark Office*